Figure 1:
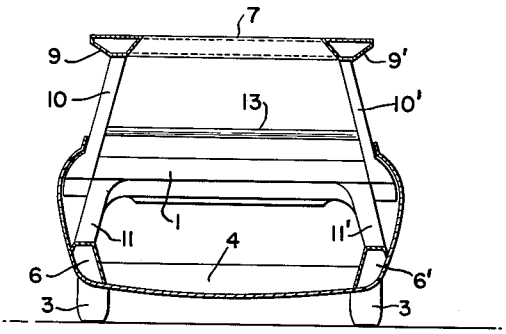

May 30, 1961 B. BARÉNYI 2,986,423
MOTOR VEHICLE FRAME BODY CONSTRUCTION
Filed Oct. 1, 1957

INVENTOR
BÉLA BARÉNYI

BY *Dicke and Craig*

ATTORNEYS

United States Patent Office 2,986,423
Patented May 30, 1961

2,986,423
MOTOR VEHICLE FRAME BODY CONSTRUCTION
Béla Barényi, Stuttgart-Vaihingen, Germany, assignor to Daimler-Benz Aktiengesellschaft, Stuttgart-Unterturkheim, Germany
Filed Oct. 1, 1957, Ser. No. 687,519
Claims priority, application Germany Oct. 1, 1956
9 Claims. (Cl. 296—28)

The present invention relates to a frame construction for a motor vehicle, and more particularly to the frame construction of a rear engine motor vehicle having a closed top to form a sedan-type vehicle.

The present invention essentially consists therein that the center part of the frame construction consists of six main cross bearer members of which a pair each is disposed below the seat rows, above the upper edge of the tires and in the plane of the roof, of four longitudinal bearer members which each connect in a pair-like manner the cross bearer members of the floor and of the roof with each other, and of four vertical or upwardly extending bearer members which are disposed at the corners of the top and which connect the bottom or floor frame and the roof frame with each other as well as with the cross bearer members disposed therebetween.

By the use of a construction in accordance with the present invention, the frame construction resembles approximately the shape of a hexagon, as seen in side view, at the six corners of which are disposed the main cross bearer members.

The present invention provides in an advantageous manner a frame construction for a motor vehicle which is extraordinarily simple and clear in its construction, which provides favorable spatial conditions and which excels by its great rigidity and resistance to twisting.

According to the present invention, the framework may be advantageously so constructed that the cross bearer members disposed below the seat rows are at least approximately the same distance from each other and from the wheel axes, thereby dividing the wheel base into three approximately equal sections. In order that the longitudinal bearer members of the floor frame do not impair the space for the feet of the passengers, the longitudinal bearer members may be appropriately disposed along the lower lateral edges of the vehicle body and may accommodate therebetween the cross bearer members. A frame construction for cellular type vehicles may furthermore be advantageously so constructed in accordance with the present invention that at least at one vehicle end, for example, at the rear, and end cell is pivotally connected to the ends of the longitudinal bearer members of the floor frame of the vehicle.

The upright or vertical bearer members which connect the floor and roof frame of the framework with each other may thereby be advantageously so arranged that they are disposed at least in part within the surfaces of the lateral walls. The vertical bearer members may thereby be appropriately constructed angularly shaped, as seen in side view, and the lower edge of the lower leg portion thereof may thereby proceed arcuately and concentrically to the tire edge of the respective vehicle wheel. The vertical or upright bearer members in accordance with the present invention may be constructed either unitarily or of a plurality of parts. In the latter case, the lower leg portion may be arranged offset with respect to the upper leg portion.

The preferably angularly shaped roof frame of the framework may thereby advantageously be so constructed that the longitudinal and cross bearer members thereof are disposed in a common plane and simultaneously therewith form the rim portion of the roof. The cross section of the roof bearer members may thereby have at least approximately the form of a triangle which stands on one of its points or of a trapezoid.

Additional to the aforementioned main bearer members of the frame construction, auxiliary cross bearer members may be arranged in accordance with the present invention between the main cross bearer members, especially along the lower edges of the front and rear windows.

The construction of the frame in accordance with the present invention may thereby be simplified by the fact that all bearer members extend essentially at least approximately rectilinearly. The longitudinal and cross bearer members may thereby be disposed parallel to each other. The weight of the frame may also be kept low by forming all the bearer members as hollow bodies and by constructing the same box shaped or tubularly shaped.

Accordingly, it is an object of the present invention to provide a frame for a motor vehicle which excels by its simplicity and clean lines as well as by its rigidity and resistance to twisting.

Still another object of the present invention is to provide a frame construction for a motor vehicle, particularly for a rear engine motor vehicle in which longitudinal, cross and upright bearer members are always used in pairs to provide an essentially symmetrical design of the frame.

Another object of the present invention is the provision of a frame which is of light weight notwithstanding its great rigidity and resistance to twisting.

A still further object of the present invention resides in the provision of a frame construction which resembles approximately a hexagon as seen in side view and which has at least two cross bearer members disposed above the upper tire edge of the wheels to connect the upright bearer members with each other in the rear and front thereof.

A still further object of the present invention is the provision of a highly rigid, compact yet lightweight frame for the center part of a motor vehicle, particularly for the center cell of a cellular type motor vehicle.

Figure 2:
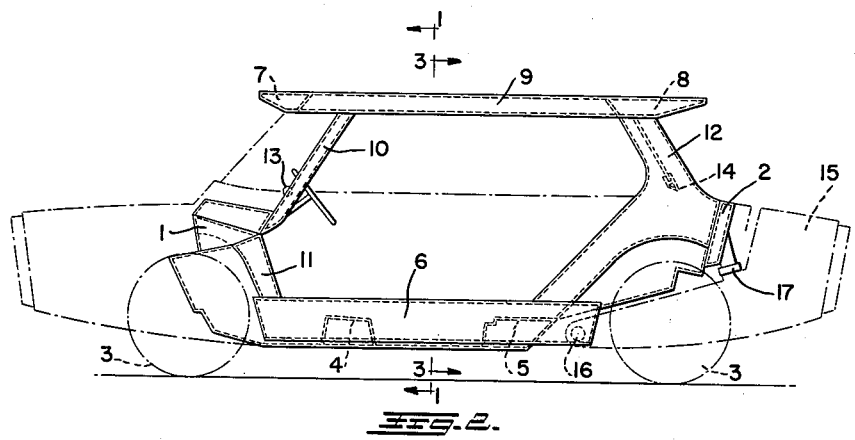
Figure 3:
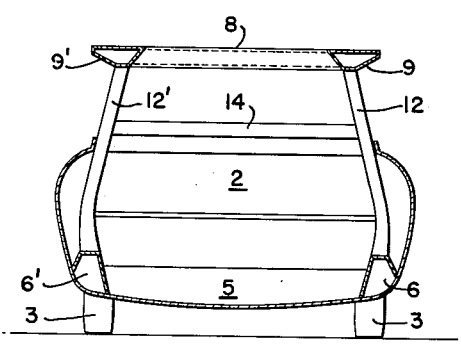

These and other objects, features and advantages of the present invention will become more obvious from the following description when taken in connection with the accompanying drawing, which shows, for purposes of illustration, one embodiment in accordance with the present invention, and wherein Figure 1 is a transverse cross-sectional view taken along line 1—1 of Figure 2 through a motor vehicle provided with a frame construction in accordance with the present invention and looking from the center of the vehicle forwardly, Figure 2 is a side view of the vehicle of Figure 1 with certain body parts omitted for clarity's sake, and Figure 3 is a transverse cross-sectional view taken along line 3—3 of Figure 2 of the vehicle frame construction in accordance with the present invention and looking toward the rear of the vehicle.

Referring now to the drawing, wherein like reference numerals are used throughout the various views to designate like parts, a frame construction in accordance with the present invention of the passenger motor vehicle shown in the drawing which, for example, may be provided with a pontoon-shaped vehicle body and a closed top, comprises two main cross bearer members 1 and 2 which are disposed above the upper tire edge of the wheels 3 and which are located rearwardly with respect to a vertical transverse plane passing through the axis of a respective wheel. The main cross bearer members 1 and 2 also constitute the foremost and rearmost end members of the framework. Further cross bearer members 4 and 5 are each disposed below one of the two rows of seats (not shown). The cross bearer members 4 and 5 form together with the two longitudinal bearer members 6 and 6' the frame of the vehicle floor. The longitudinal bearer members 6 and 6' extend along the lower lateral edges of the body walls of the vehicle body and accommodate therebetween the two cross bearer members 4 and 5 which, to provide the rigidity constituting one of the objects of the invention, are joined to the bearer members 6 and 6' intermediate the ends of the latter, as shown in Figure 2. The upper termination of the frame is formed by two cross bearer members 7 and 8 which are completed by two longitudinal bearer members 9 and 9' into an angularly shaped frame and which carry the roof of the vehicle top or even form part of the roof themselves, as more fully described in my copending application, Serial No. 687,520, filed October 1, 1957, and entitled "Roof Construction for Motor Vehicles."

The bearer members 7, 8, 9 and 9' of the roof frame are so constructed that the cross section thereof resembles the form of a triangle standing on one of its points or of a trapezoid, and thereby project outwardly with one edge thereof beyond the lateral walls of the vehicle top adjoining the roof from below and constituted by the body walls as well as primarily by the window surfaces of the windshield, side or door windows and the rear window. The side of this cross-sectional shape as shown is upwardly inclined and thus promotes visibility from the interior of the car.

The six main cross bearer members 1, 2, 4, 5, 7 and 8 of the frame described hereinabove are thereby disposed in three different parallel, for instance, horizontal planes, one above the other, and thus form, as seen from the side thereof, the corners of approximately a hexagon. They are connected with each other in any appropriate manner by vertical or upright bearer members either directly or over the longitudinal bearer members 6, 6' and 9, 9'. The vertical or upright bearer members preferably are disposed at the corners of the vehicle top. For example, the front main cross bearer member 1 is connected, on the one hand, with the longitudinal bearer members 9 and 9' of the roof frame by means of two inclined upwardly extending bearer members 10 and 10' and, on the other, with the longitudinal bearer members 6 and 6' of the floor frame by means of two further upright or vertical bearer members 11 and 11'. The upper vertical bearer members 10 and 10' and the lower vertical bearer members 11 and 11' may thereby be arranged offset with respect to each other at the cross bearer 1, as shown in Figure 1.

The rear main cross bearer member 2 is connected with the longitudinal bearer members 6 and 6' of the floor frame and with the cross bearer member 8 of the roof frame by means of two unitarily or integrally constructed vertical or upright bearer members 12 and 12' which are constructed angularly shaped and are disposed in the planes or surfaces of the lateral walls of the vehicle body. The lower edge of the vertical bearer members 12 and 12' are provided with an arcuately shaped cut-out portion to accommodate therein the rear wheels 3.

All of the bearer members of the frame described so far are preferably constructed as hollow bearer members, for example, box-shaped, and are connected with each other in any suitable manner, for example, by welding.

Additionally to the aforementioned main cross bearer members 1, 2, 4, 5, 7 and 8, an appropriate tubularly shaped auxiliary cross bearer member 13 disposed, for example, below the front window and between the two vertical bearer members 10 and 10', and a further tubularly shaped auxiliary bearer member 14 disposed below the rear window and between the vertical bearer members 12 and 12' may be provided in the frame construction according to the present invention.

A rear cell 15 containing the drive aggregate of the vehicle is pivotally connected to the rear ends of the longitudinal bearer members 6 and 6' of the bottom or floor frame 4, 5, 6 and 6' by means of a suitable pivotal connection 16. The rear cell 15 is also elastically supported at the main cross bearer member 2 at 17 in any appropriate manner, for example, by means of appropriate elastic abutment means, springs and/or shock absorbers.

Since the construction of the motor vehicle body as well as other details thereof form no part of the present invention, the same have only been illustrated schematically. The roof may be constructed in any suitable manner, for example, as more fully disclosed in the aforementioned copending application. The roof frame may be contstituted by the frame bearer members 7, 8, 9 and 9', i.e., by four individual bearer members suitably connected with each other and each formed of either one or preferably several separate sections also suitably connected with each other. However, the roof frame may also be constructed of a single appropriately shaped hollow bearer member forming longitudinal and cross sections and enclosing and supporting the roof on all sides thereof and possibly forming a part thereof itself.

While I have shown and described one embodiment in accordance with the present invention, it is understood that the same is not limited thereto but is susceptible of many changes and modifications within the spirit of the present invention, and I therefore intend to cover all such changes and modifications as encompassed by the appended claims.

I claim:

1. A frame construction for motor vehicles having a closed top, comprising a plurality of bearer members forming the center section of the frame and including six main cross bearer members with a pair thereof each disposed in one of three essentially parallel planes, four longitudinal bearer members of which two longitudinal bearer members each interconnect the pair of main cross bearer members disposed in the lowermost and uppermost of said planes to thereby form the frame for the floor and for the roof of the vehicle, and four upwardly extending bearer members interconnecting the floor and roof frames with the two cross bearer members disposed in the intermediate plane, said first-named frame in side view resembling a hexagon, in the corners of which are disposed said main cross bearer members, said two cross bearer members in said intermediate plane constituting respectively the foremost and rearmost end members of said first-named frame, the said pair of said main cross bearer members in said lowermost plane being joined to two of said longitudinal members at portions thereof spaced from the lower corners of said hexagon.

2. A cellular type motor vehicle having a frame construction and a rear cell, said frame construction comprising a plurality of bearer members forming the center section of said frame and including six main cross bearer members with a pair thereof each disposed in one of three essentially parallel planes, four longitudinal bearer members of which two longitudinal bearer members each interconnect the pair of main cross bearer members disposed in the lowermost and uppermost of said planes to thereby form the frame for the floor and for the roof of the vehicle, and four upwardly extending bearer members interconnecting the floor and roof frames with the two cross bearer members disposed in the intermediate plane, and means for pivotally connecting said rear cell to said frame construction at the ends of the longitudinal bearer members of said floor frame, said rear cell being further provided with elastic support means at the rearward one of said two cross members disposed in said intermediate plane, said rearward one of said two cross members joining rearwardly facing portions of the rear ones of said four upwardly extending bearer members.

3. A frame construction for a motor vehicle having a closed top supporting a roof and several rows of seats, comprising a plurality of bearer members forming the center section of the frame having an essentially hexagonal shape as seen in side view and including six main cross bearer members with a pair thereof each disposed in one of three essentially parallel planes located respectively below said seat rows, above the upper portions of the tires and in the plane of said roof, said second named pair of cross bearer members being box-shaped and disposed above said upper portions, four longitudinal bearer members of which two longitudinal bearer members each interconnect the floor pair and roof pair of main cross bearer members to thereby form the frame for the floor and for the roof of the vehicle, and four upwardly extending bearer members disposed in the corners of the top and interconnecting the floor and roof frames with the two cross bearer members disposed in the plane lying above said upper portions of the tires, the rearmost two of said four upwardly extending bearer members having rearwardly projecting extensions, one of said pair of main cross bearer members being secured to the rear ends of said extensions.

4. A frame construction according to claim 3, wherein said top includes a front and a rear window, and further comprising auxiliary bearer members disposed along the lower edges of said windows between said pairs of main cross bearer members located in the said planes of the roof and above the upper tire edges.

5. A frame construction for a motor vehicle according to claim 3 wherein said two longitudinal bearer members interconnecting said floor pair are joined to said floor pair at portions of said two longitudinal members spaced from the lower corners of said hexagonal shape.

6. A frame construction for a motor vehicle having a closed top, comprising a plurality of bearer members forming the center section of the frame and including six main cross bearer members with a pair thereof each disposed in one of three essentially horizontal planes, four longitudinal bearer members of which two longitudinal bearer members each interconnect the pair of main cross bearer members disposed in the lowermost and uppermost of said planes to thereby form the frame for the floor and for the roof of the vehicle, and four upwardly extending bearer members interconnecting the floor and roof frames with the two cross bearer members disposed in the intermediate plane, the rear two of said four upwardly extending bearer members having intermediate their ends rearwardly projecting extensions, one of said two last-named cross bearer members being joined to the rear ends of said extensions, the two main cross bearers disposed in the lowermost plane having approximately the same distance from each other and from the wheel axes, said frame construction further supporting rows of seats, one each of said two main cross bearers being disposed beneath one of said rows of seats.

7. A frame construction for a motor vehicle according to claim 6, wherein said upwardly extending bearer members are disposed at least partly within the lateral walls of said vehicle and are angularly shaped as seen in side view.

8. A frame construction for a motor vehicle having a closed top, comprising a plurality of bearer members forming the center section of the frame and including six main cross bearer members with a pair thereof each disposed in one of three essentially parallel planes, four longitudinal bearer members of which two longitudinal bearer members each interconnect the pair of main cross bearer members disposed in the lowermost and uppermost of said planes to thereby form the frame for the floor and for the roof of the vehicle, and four upwardly extending bearer members interconnecting the floor and roof frames with the two cross bearer members disposed in the intermediate plane, the cross section of each of said longitudinal bearer members in the uppermost of said planes being that of an inverted trapezoid of hollow box section extending outwardly of the said upwardly extending bearer members and forming lateral extremities of the said roof of said vehicle.

9. A frame construction for a motor vehicle having a closed top supporting a roof and several rows of seats, comprising a plurality of bearer members forming the center section of the frame having an essentially hexagonal shape as seen in side view and including six main cross bearer members with a pair thereof each disposed in one of three essentially parallel planes located respectively below said seat rows, above the upper portions of the tires and in the plane of said roof, four longitudinal bearer members of which two longitudinal bearer members each interconnect the floor pair and the roof pair of main cross bearer members to thereby form the frame for the floor and for the roof of the vehicle, and four upwardly extending bearer members disposed in the corners of the top and interconnecting the floor and roof frames with the two cross bearer members disposed in the plane lying above said upper portions of the tires, said roof frame having a cross section resembling a triangle at least approximately standing on one of the points thereof, said roof frame having an outwardly facing part corresponding to one leg of said triangle, said outwardly facing part being inclined upwardly to afford good visibility in an outward and upward direction from the interior of said vehicle, said roof frame further comprising a substantially horizontal upwardly facing part corresponding to another leg of said triangle, said roof frame being connected to said upwardly extending bearer members at points corresponding to said one of the points of said triangle.

References Cited in the file of this patent

UNITED STATES PATENTS

| | | |
|---|---|---|
| 1,523,636 | Dunn | Jan. 20, 1925 |
| 1,556,778 | Forostovsky | Oct. 13, 1925 |
| 1,832,845 | Grimm | Nov. 24, 1931 |
| 2,306,416 | Waterhouse | Dec. 29, 1942 |
| 2,369,579 | Kobligk | Feb. 13, 1945 |
| 2,389,907 | Helmuth | Nov. 27, 1945 |
| 2,520,074 | Wernig et al. | Aug. 22, 1950 |
| 2,576,354 | Oswald | Nov. 27, 1951 |
| 2,620,221 | Romano | Dec. 2, 1952 |
| 2,716,040 | Barenyi | Aug. 23, 1955 |

FOREIGN PATENTS

| | | |
|---|---|---|
| 621,640 | Germany | Nov. 11, 1935 |
| 736,060 | Great Britain | Aug. 31, 1955 |